United States Patent
Young

(10) Patent No.: US 6,250,605 B1
(45) Date of Patent: Jun. 26, 2001

(54) VALVE ACTUATOR APPARATUS

(75) Inventor: Terry G. Young, Spring, TX (US)

(73) Assignee: Safoco, Inc., Houston, TX (US)

( * ) Notice: Subject to any disclaimer, the term of this patent is extended or adjusted under 35 U.S.C. 154(b) by 0 days.

(21) Appl. No.: 09/538,881

(22) Filed: Mar. 30, 2000

Related U.S. Application Data

(63) Continuation of application No. 08/968,904, filed on Nov. 6, 1997, now Pat. No. 6,089,531, which is a continuation of application No. 08/206,424, filed on Mar. 4, 1994, now abandoned.

(51) Int. Cl.$^7$ .......................... F16K 31/145; F16K 51/00
(52) U.S. Cl. .......................... 251/291; 251/61.4; 251/285
(58) Field of Search ........................ 251/61.4, 285, 251/291, 284

(56) References Cited

U.S. PATENT DOCUMENTS

| | | |
|---|---|---|
| 2,548,847 | 4/1951 | Rossmann et al. . |
| 2,892,608 | 6/1959 | Collins . |
| 3,446,241 | 5/1969 | Skoli . |
| 3,602,478 | 8/1971 | Cairns ............................ 251/58 |
| 3,958,592 | 5/1976 | Wells et al. ................... 51/63.6 |
| 3,985,151 | 10/1976 | Smith ............................ 251/58 |
| 4,139,016 | 2/1979 | Byrnes ........................... 251/291 |
| 4,199,131 | 4/1980 | Boski et al. .................... 251/291 |
| 4,354,425 | 10/1982 | Bruton et al. .................. 251/61.4 |
| 4,489,756 | 12/1984 | Balz ............................... 251/61.4 |
| 4,783,046 | 11/1988 | Young et al. ................... 251/61 |
| 4,967,785 | 11/1990 | Young ........................... 92/128 |
| 5,178,360 | 1/1993 | Young ........................... 251/63.6 |

OTHER PUBLICATIONS

Flier: MHA Actuators, Rev.C–94, Dwg. No. 44490, pp. K–194–195. Axelson. Admitted prior art.
Flier: "AM Actuators," Rev.C–94, Dwg. No. 45087, pp. K–132–133. Axelson. Admitted prior art.
Flier: "Maintenance and Operating Instructions: Diaphragm Actuated Gate Valve, Model DAV, for Standard Service," pp. 1–3. Baker CAC, Houston, Texas, 1989.
Product Bulletin: "Dia–Flex Pneumatic Actuator: Maintenance and Operating Instructions; Product Commodity No. 885–92," pp. 1–10. Baker CAC, Houston, Texas, Aug. 10, 1988.
Flier: "Surface Safety Equipment: Guardian Series 2000; Piston Pneumatic Actuator," 1 page. Admitted prior art.
Flier: "Surface Safety Equipment: Guardian Series G1000; Diaphragm Pneumatic Actuator," 1 page. Admitted prior art.
Flier: "Pneumatic Actuator," 3 pages. Harold Brown Company, Houston, Texas. Admitted prior art.
Flier: "Surface Safety valve (SSV): Hydraulic Actuator," 2 pages. McEvoy–Willis. Admitted prior art.
Flier: "Surface Safety Equipment and Systems: Type U Otis Pneumatic Actuator/Gate Valve Combination–Extended Bonnet," 1 page. Otis. Admitted prior art.

(List continued on next page.)

Primary Examiner—A. Michael Chambers
(74) Attorney, Agent, or Firm—Browning Bushman

(57) ABSTRACT

A valve actuator apparatus and method comprises an operator housing secured to a bonnet assembly. The bonnet assembly is secured to the valve body, and includes a bonnet stem movably within a bonnet housing for moving a gate within the valve body to open and close the valve. A downstop member is fixably secured to the bonnet stem and engages removable stem spacers which are added or removed to obtain a selected bonnet stem drift setting. The operator housing connects to a base ring that surrounds the bonnet housing and rotates to allow positioning of a fluid port in the operator housing. The operator housing may removed and replaced without altering the bonnet stem drift adjustment. A top shaft extends from the operator housing and rotates with respect to the bonnet stem to prevent torque transmission from the top shaft to the bonnet stem. A replaceable sealing cartridge sealingly supports the top shaft for axial movement within the operator housing.

3 Claims, 7 Drawing Sheets

OTHER PUBLICATIONS

Flier: "Safoco Diaphragm Actuated Gate Valve: Model DAGV," 2 pages. Safoco, Inc., Houston, Texas. Admitted prior art.

Catalogue: "W–K–M Safety Systems (Cont'd): Pow–R–-Gard SSV Actuators for 20,000 and 30,000 psi Service," p. 6582. W–K–M Safety Systems, Houston, Texas, Admitted prior art.

Catalogue: "Surface Safety System (Cont'd): Saf–T–Gard SSV Actuators; Saf–T–Gard SSV Actuators," pp. 7532–7533. W–K–M Safety Systems, Houston, Texas. Admitted prior art.

Flier: "Model A: Pneumatic Actuated Gate Valve: Piston Style Actuator," 1 page. WK Industries Inc., Houston, Texas. Admitted prior art.

Flier: Taurus Type 91: "Power Actuators," 4 pages. Admitted prior art.

Flier: "RD–Presco–Dyne: Rolling Diaphragm Valve Actuator; Pneumatically Powered with Spring Return," 4 pages. Barber Industries, Ltd. Calgary, Alberta, Canada. Admitted prior art.

"Operating Manual for Hydraulic Operated–Spring Opposed Valve Actuation Systems," pp. 1–12. Barber Industries Ltd., Houston Texas. Admitted prior art.

Maintenance and Operating Instructions—Baker CAC Bonnets, 8 pages. Baker CAC Inc., Unit 880–49, Jun. 1, 1980.

Product Bulletin: "Bonnet Assembly," Unit No. 879–0609B, 1 page. Baker Oil Tools,Houston, Texas, May 23, 1983.

Instruction Pamphlet: "Bonnet Seal Replacement," 1 page. Baker CAC, Belle Chasse, Louisiana, Sep. 15, 1985.

Product Bulletin: Pneumatic Actuator Dia–Flex, 2 pages. Unit No. 885–92–1403E, May 13, 1986.

Catalogue:"Otis 'U' Hydraulic Actuator/Gate Valve Combination," "Hydraulic Actuator Detail Illustration," and "Type U Otis Hydraulic Surface Saftey Valve Actuator," inin "Otis Surface Safety Equipment and Systems" 4 pages, 1982.

Brochure: "DA–Presco–Dyne: Self Contained Actuation System for Rising Stem Valves," 4 pages. Bulletin 690, Barber Industries Ltd., Calgary, Alberta, Canada, Oct. 1991.

Three untitled drawings of valve actuators sold by Aerborne Control Systems, Inc. in 1984–1985.

Product Bulletin: Pneumatic Actuator Tandem Dia–Flex, Unit No. 885–92–T153, 2 pages. Baker CAC Inc., Sep. 23, 1987.

VALVE ACTUATOR APPARATUS

CROSS-REFERENCE TO RELATED APPLICATIONS

This application is a continuation of U.S. application Ser. No. 08/968,904, filed on Nov. 6, 1997, now U.S. Pat. No. 6,089,531, which is a continuation of U.S. application Ser. No. 08/206,424, filed on Mar. 4, 1994, now abandoned.

1. FIELD OF THE INVENTION

The present invention relates generally to an actuator apparatus and method and, more particularly, to a valve actuator including a bonnet assembly having an improved downstop mechanism that is rotatably free with respect to a floating top shaft and engageable with respect to a replaceable operator without affecting bonnet stem drift adjustment.

2. BACKGROUND OF THE INVENTION

Gate valves are generally comprised of a valve body having a central axis aligned with inlet and outlet passages, and a space between the inlet and outlet passages in which a slide, or gate, may be moved perpendicular to the central axis to open and close the valve. In the closed position, the gate surfaces typically seal against sealing rings which surround the fluid passage through the valve body. Gate valves have been used for centuries to control the flow of a great variety of fluids. Often the fluid to be controlled by the gate valve is under pressure. In the petroleum industry, gate valves are used along piping at various locations, and in particular are used in piping referred to in the petroleum industry as a christmas tree, which is used as part of a drilling operation.

Actuators to open and close the gate valves may include manual operators, diaphragm-type operators, and hydraulic operators. The actuator may include a bonnet assembly, which interconnects the valve body and the valve gate, and a bonnet stem which is movable with the gate via an operator. It is often desirable to be able to change the operator without changing the bonnet assembly. However, this is difficult because, among other reasons, such a change also requires changes in up-stop and down-stop adjustments which assure the drift of the gate is positioned correctly in the open and closed position. If the valve is connected to a christmas tree or is under pressure, it may be difficult to determine whether drift adjustments have been made correctly when replacing the operator since the bore of the valve is not available to receive a drift alignment check tool. Removal of a valve under pressure in a christmas tree to make drift adjustments may take considerable time and cause substantial inconvenience.

It is desirable to combine a manual operator with a diaphragm-type or hydraulic operator for back-up and test purposes. This combination typically results in the presence of a top shaft extending from the operator that may also serve to indicate whether the valve is open or closed. Because the top shaft is often exposed to the atmosphere, it may attract contaminants that cause damage to the top shaft seals or bearings. In the past, close tolerances have been required in the top shaft that have exacerbated the contaminant problems. As well, torque applied to the top shaft, which may be caused by manual operation, may cause gate, gate seal, or drift misalignment. Furthermore, changing the top shaft or the top shaft seals has previously required removal of the operator housing.

The operator typically has a maximum force capability for applying to the bonnet stem. It is sometimes desirable to provide additional opening/closing power on a temporary basis without having to remove the original operator. It is also desirable that the same operator be adaptable to various control accessories, such as a mechanical override, hydraulic override, heat sensitive lock open device, block open cap, electrical limit switch and/or other electrical accessories.

Another significant problem, especially related to diaphragm-type operators, is leakage of the diaphragms in the region adjacent the top shaft or bonnet stem. Such leakage may be caused by wear, loss of flexibility, and pinching or wear that occurs should the diaphragm make contact with the diaphragm case. This leakage may gradually develop, and may slowly reduce the operator power.

In some cases, the positioning of the gate valves in the christmas tree and other types of installations may be restricted because of piping which is supplied to operate an automatic actuator that controls gate movement. In the past, it has been difficult to use precisely laid piping because the position of the operator fluid port is fixed with respect to the operator housing. Allowing the operator to rotate with respect to the bonnet could result in leakage or cause misalignment of the up-stop and downstop drift adjustments of the valve gate.

Thus, there has been a long felt need in the industry to provide an improved actuator that allows a more adaptable installation configuration, that reduces maintenance and installation time, and that increases long term durability. Persons skilled in the art will appreciate the present invention which provides solutions to these and other problems associated with valve actuators.

SUMMARY OF THE INVENTION

The present invention relates to a valve actuator for moving a valve between open and closed states within a valve body. The valve actuator comprises an operator housing including a pressure chamber and a fluid port, and an operator member movable in response to the introduction of fluid into the pressure chamber through the fluid port. A bonnet housing is securable to the valve body and has a bonnet housing bore therethrough. A bonnet stem axially moves in the bonnet housing bore and is securable to the valve gate for moving the valve gate to the open and closed valve states. The bonnet stem is axially movable in response to movement of the operator member in an axial direction toward the valve body. The bonnet stem is rotatably free with respect to a top shaft.

A downstop member rotatably and axially affixed to the bonnet stem is used for stopping axial movement of the bonnet stem in a direction toward the valve. The downstop is also rotatably free with respect to the top shaft. A stop surface is fixably positioned with respect to the bonnet housing. One or more bonnet stem spacers are disposed on the stop surface and engageable by the downstop to stop axial movement of the bonnet stem for selecting a desired bonnet stem drift.

An object of the present invention is an valve actuator with improved versatility, reduced installation and maintenance, and/or increased life.

Another object of the present invention is an actuator which allows removal or exchange of the valve operator while the valve is under pressure.

Another object of the present invention is an actuator which allows removal or exchange of the valve operator without the need to reset drift adjustments or to examine the valve bore to determine if drift adjustments are correct.

A feature of the present invention is a floating top stem which requires no metal-to-metal contact during operation.

A further feature of a preferred embodiment of the present invention is an improved diaphragm having a metal insert ring to engage an elastomeric seal and thereby minimize or avoid in the diaphragm which may be caused by decreased diaphragm flexibility, leakage pinching or other reasons.

Yet another feature of present invention is a replaceable seal cartridge that allows renewal of top stem seals without removing the operator.

An advantage of the present invention is an economical construction for a valve actuator that is relatively simple yet reliable in construction, and is easy to service.

These and other objects, features, and advantages of the present invention will become apparent from the drawings, the descriptions given herein, and the appended claims.

While the present invention will be described in connection with presently preferred embodiments, it will be understood that it is not intended to limit the invention to those embodiments. On the contrary, it is intended to cover all alternatives, modifications, and equivalents included within the spirit of the invention.

DETAILED DESCRIPTION OF THE PREFERRED EMBODIMENTS

Figure 1A:
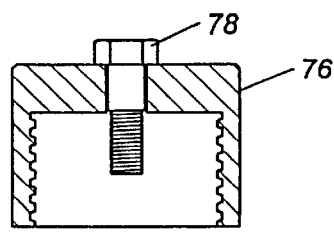
FIG. 1A is an elevational view, partially in section, of a block open cap attachable to the valve actuator of FIG. 1.
Figure 1:
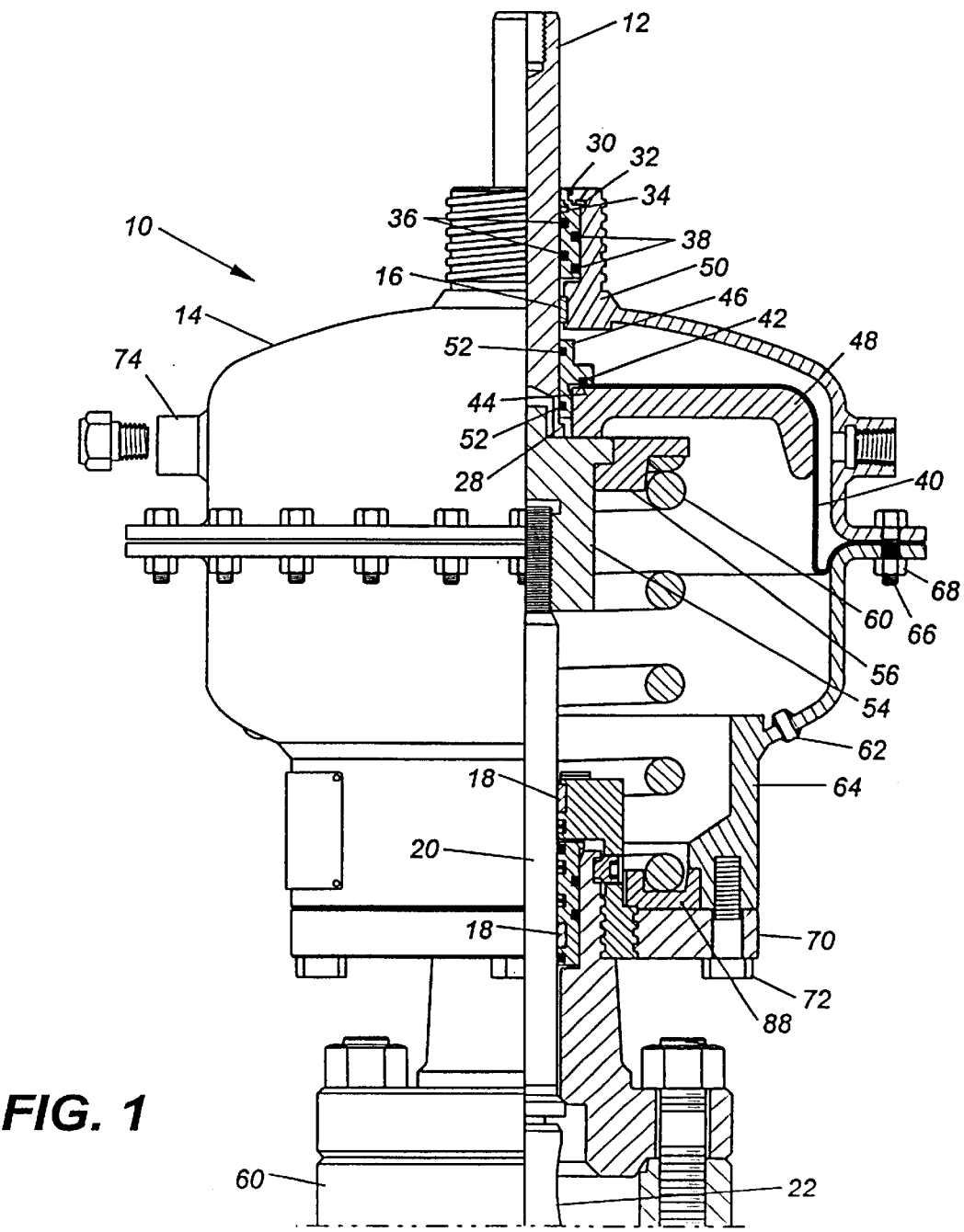
FIG. 1 is an elevational view, partially in section, of a diaphragm-type valve actuator in accord with the present invention.

Referring now to the drawings, and more particularly to FIG. 1, a diaphragm-type valve actuator 10 is shown in accord with the present invention. Top shaft 12, which is preferably formed from stainless steel, effectively floats with respect to top diaphragm case 14. As a general matter, all non-stainless metallic components in actuator 10 are preferably coated for protection against environmental conditions. Wear bearing 16, as well as wear bearings 18 (shown in detail in FIG. 2), are preferably non-metallic to eliminate close tolerance problems normally associated with the actuator top shaft and bonnet stem. The wear bearings effectively suspend top shaft 12 and bonnet stem 20 to thereby prevent metallic contact during operation. Thus, the wear bearings are preferably non-metallic and made from relatively hard plastic-like materials, such as Molygard, Nylatron, or Delrin. The wear bearings and other plastic-like components discussed hereinafter may also be made from various plastic-like materials such as, but not limited to, nylons, thermoplastics, resins, polyurethanes, phenolics, acetals, polyacrylates, epoxides, polycarbonates, polyester, aramids, polymers, molythane 90, and fluorelastomers.

Figure 5:
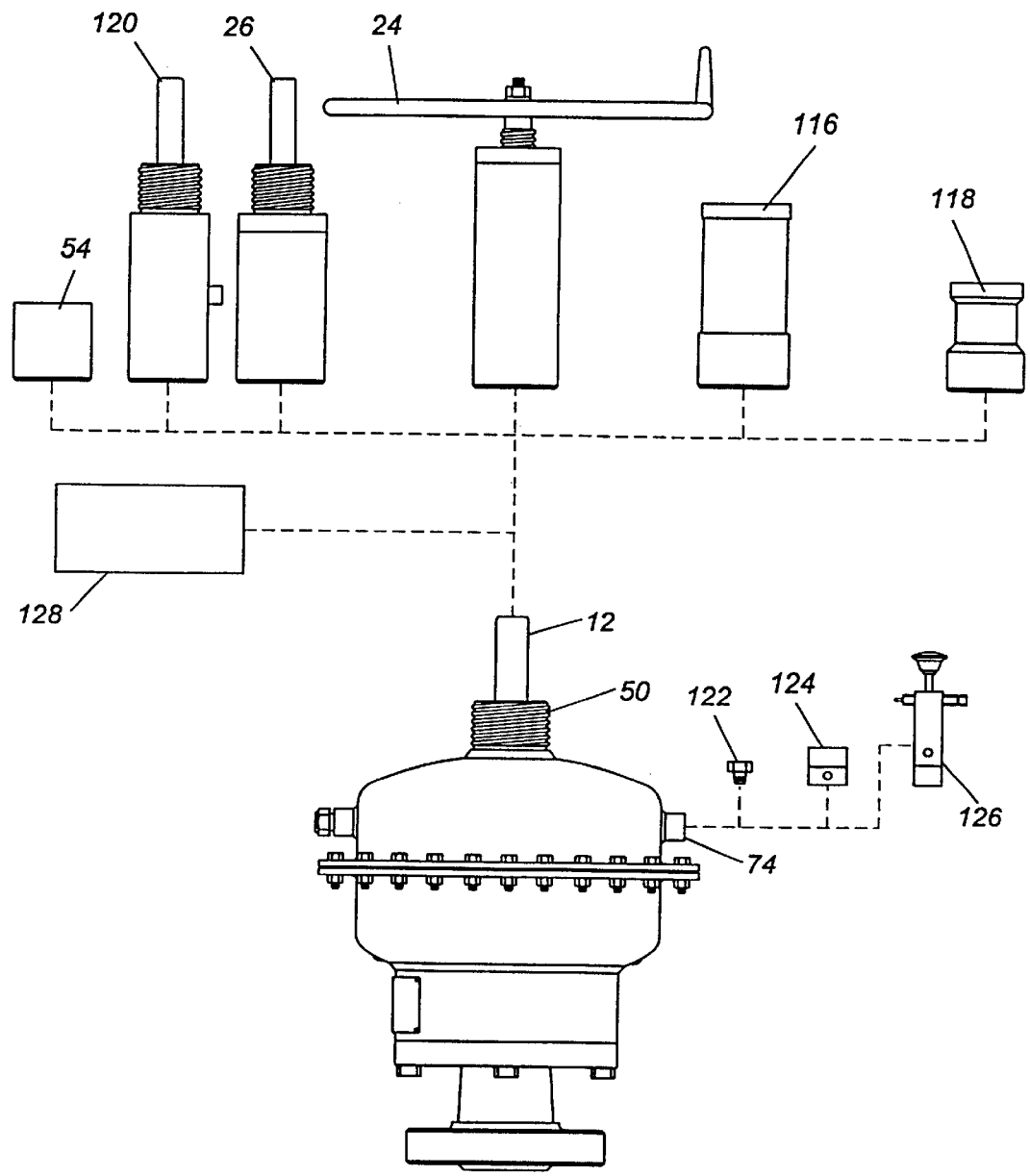
FIG. 5 is a schematical representation of actuator accessory connections in accord with the present invention.

Top shaft 12 rotates independently of and is designed to eliminate transmission of torque to bonnet stem 20, gate 22, and/or gate seats (not shown) when using a manual override, such as manual override 24 shown in FIG. 5. Top shaft 12 preferably is large enough in diameter to prevent bearing and buckling stresses when loaded by manual override 24 or hydraulic override 26 shown in FIG. 5. (See also the dual actuator system of FIG. 6 and hydraulic actuator of FIG. 7). A large bottom shoulder 28 on top shaft 12 prevents top shaft 12 from being expelled from actuator 10.

Top seal cartridge 30 can be removed for replacement as a single unit without disassembling top diaphragm housing 14. Top seal cartridge 30 is preferably formed of a plastic-like material such as Delrin and is held in place by retainer ring 32 which is preferably stainless steel. Top seal cartridge 30 incorporates rod wiper 34 to keep the shaft sealing region therebelow clean of dirt, grease, and other contaminants for longer life of the seals. Rod wiper 34 is preferably made from Molythane 90. Top seal cartridge 30 contains dual reciprocating stem seals 36 and dual static seals 38 to ensure seal integrity and long life. These and other seals may be T-seals or other substantially elastomeric seals, such as O-ring seals.

Diaphragm 40 is preferably formed of nitrile laminated with several layers of nylon to ensure strength and flexibility for years of service. Materials such as Viton, a fluoroelastomer, may be used for $H_2S$—$CO_2$ applications. The layers of nylon in diaphragm 40 eliminate the need for lubrication and do not experieic frictional wear. Diaphragm 40 includes stainless steel concentric insert seal ring 42 bonded thereto to act in conjunction with a static O-ring face seal disposed in 42 seal groove 44, which is provided in the diaphragm retaining nut 46. This seal eliminates leakage in the stem area which may normally occur due to diaphragm aging, pinching, or reduced flexibility.

Diaphragm retaining nut 46 threadably engages diaphragm retainer plate 48 for easy, accurate installation. On up strokes of actuator 10, diaphragm retaining nut 46 prevents any possible pinching of diaphragm 40 by stopping movement of bonnet stem 20 should diaphragm retaining nut 46 engage top plug 50. Diaphragm retaining nut 46 provides dual stem seals 52 to engage and reliably seal top shaft 12. Diaphragm retaining nut 46 is preferably formed of stainless steel.

Diaphragm retainer plate 48 engages downstop element 54 for downward axial movement of gate 22 via bonnet stem 20 when the cavity defined by top diaphragm housing 14 is filled with pressurized fluid, i.e. compressed air. Breather port 62 allows fluid (air) to flow out of lower diaphragm housing 64 as diaphragm retainer plate 48 moves downwardly. Downstop element 54 preferably is connected to bonnet stem 20 via large threads designed to withstand high load impacts and cycling for preventing changes in drift settings, as discussed hereinafter. Downstop element is also engaged by upper spring retainer 56 for upward movement of bonnet stem 20 induced by spring 58 and/or pressure within valve body 60.

Top diaphragm housing 14 is sealingly secured to lower diaphragm housing 64 by bolts 66 and nuts 68 which secure diaphragm 40 therebetween. Diaphragm 40 is thus anchored by this connection and acts as a seal between the top diaphragm housing 14 and the lower diaphragm housing 64. Base plate ring 70 is secured to lower diaphragm housing by bolts 72. Base plate ring 70 allows for 360 degree actuator rotation when exacting plumbing is required for connections to control pressure inlet 74. Lower spring retainer 88 secures spring 58 into a centralized position. In FIG. 1A is shown lock open cap 76 which threadably engages top plug 50 and is secured to top shaft 12 with bolt 78 to secure the valve in the open position.

Figure 2:
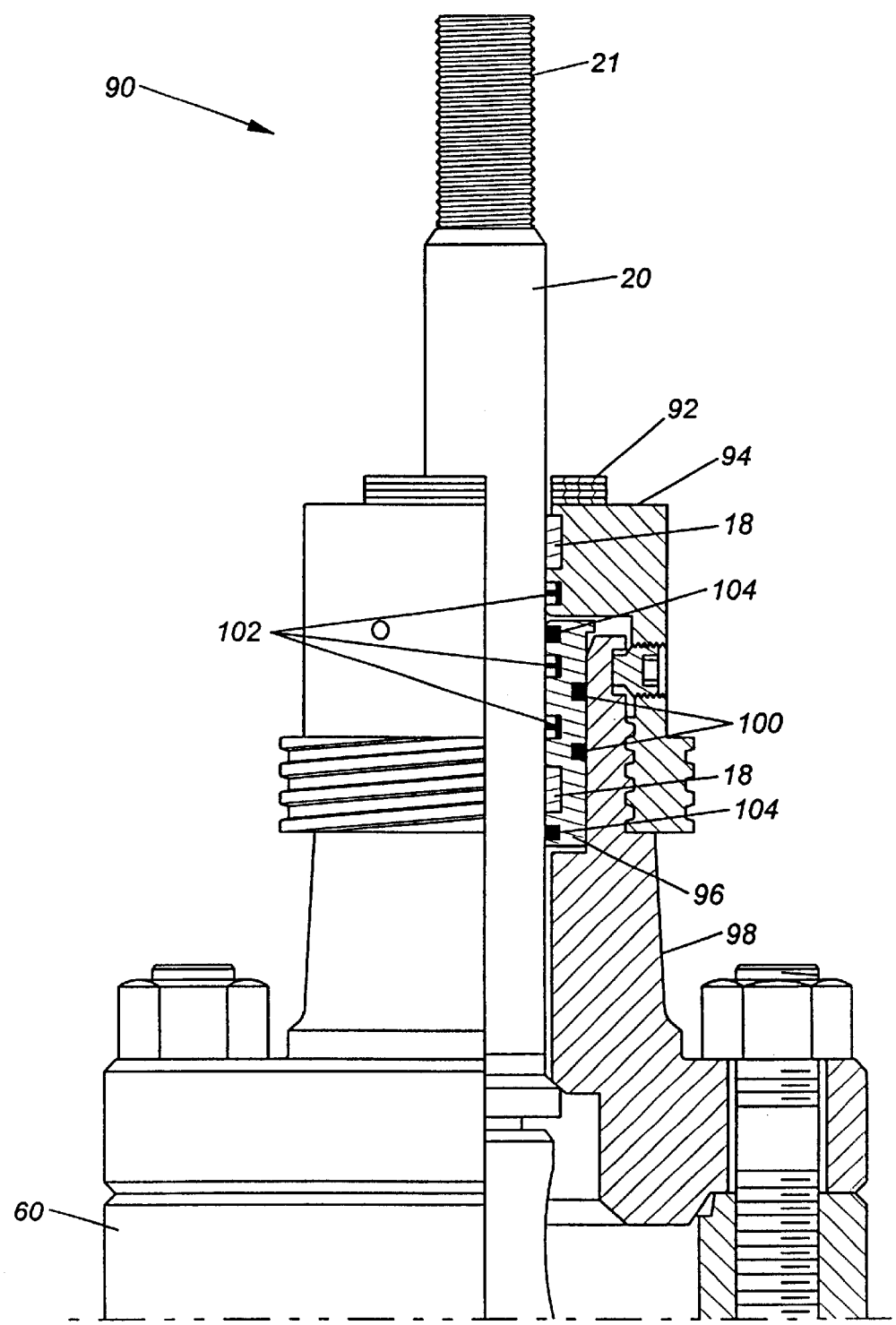
FIG. 2 is an elevational view, partially in section, of a bonnet assembly in accord with the present invention.

FIG. 2 discloses a portion of bonnet assembly 90. Bonnet assembly is shown complete with spring 58 in FIG. 4. Preferably stainless steel stem spacers 92 are positioned on top of bonnet ring 94. Stem spacers 92 are used to determine the downward stop drift by controlling the length of the stroke of bonnet stem 20 toward valve body 60. Packing cartridge 96 acts in a similar manner as top seal cartridge 30 to seal between bonnet stem 20 and bonnet housing 98. Packing cartridge 96 preferably is formed of stainless steel. Packing cartridge 96 contains O-ring seals 100. Seals 102 are preferably T-seals comprised of Viton 90 rings with nylon backups. Packing cartridge 96 also includes rod wipers 104 to protect and maintain the long life of the sealing elements by preventing contaminants in the region of the sealing elements.

Bonnet stem threads 21 are designed so that no injury to the seals occurs when the stem is passed through packing cartridge 96. Dual bearings 18 suspend bonnet stem 20 to preferably prevent contact of any metal surface thereby eliminating wear and galling to either the bonnet stem 20 or the packing cartridge 96. To prevent rotation of bonnet ring 94 with respect to bonnet housing 98, screw 106 is tightened into the corresponding groove or inset disposed adjacent the end portion of bonnet housing 98. Rotation of bonnet ring 94 with respect to bonnet housing 98 may alter the stroke length adjustments as discussed hereinafter. Bonnet ring 94 retains packing cartridge 96 in position within bonnet housing 98. Bonnet ring 94 also preferably includes an additional seal 102 for safety purposes.

Figure 3:
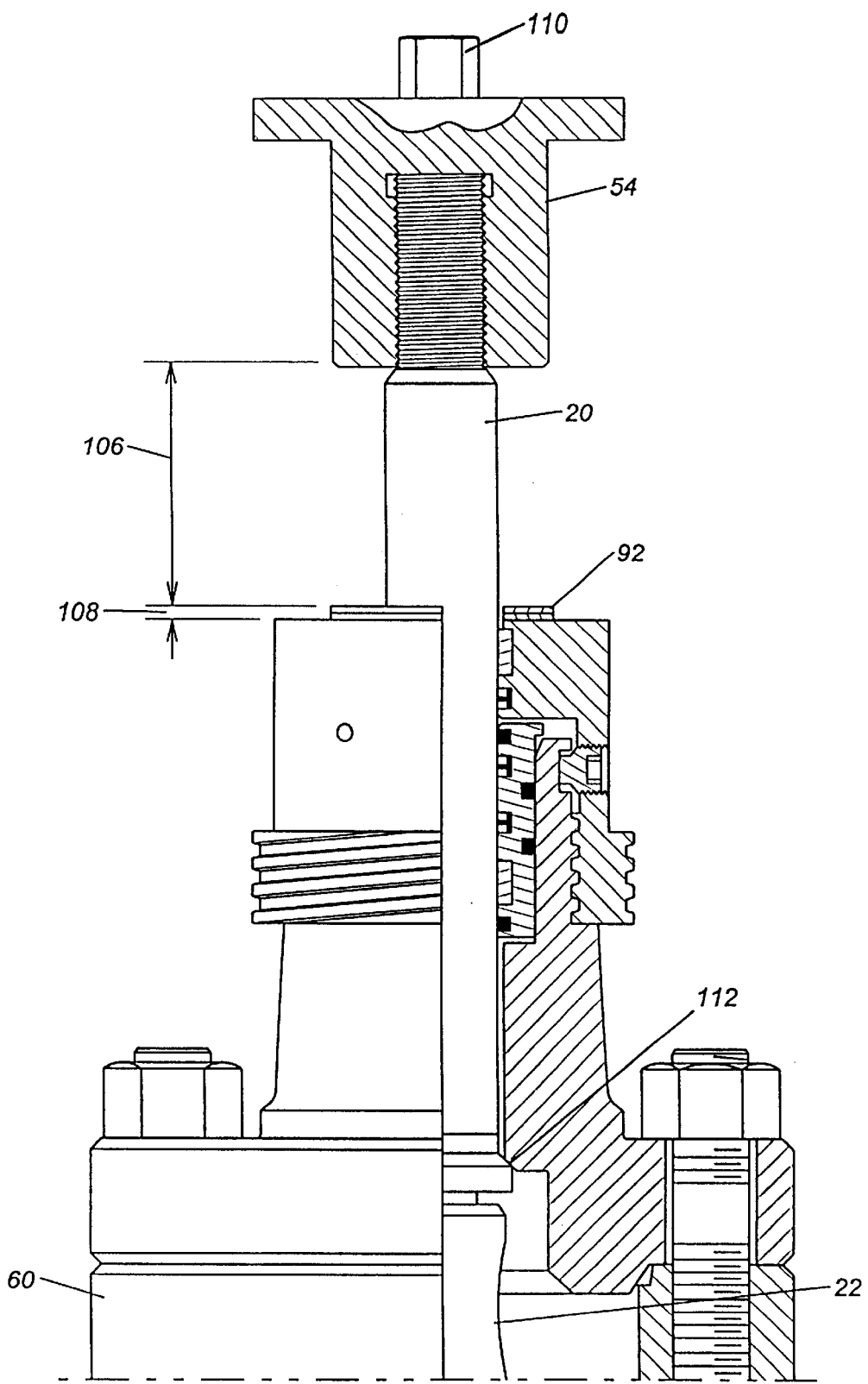
FIG. 3 is an elevational view, partially in section, of the bonnet assembly of FIG. 2 including drift adjustment lengths in accord with the present invention.

To set the downward stroke length or drift 106 of bonnet stem 20, stem spacers 92 are removed or added as necessary to increase or decrease the combined spacer width 108 as indicated in FIG. 3. In setting the bonnet stem drift, downstop 54 is first tightened to bonnet stem with drive nut 110. Bonnet stem is placed in its furthermost downward position. The position of the gate bore (not shown) through gate 22 is determined by running an appropriate drift tool (not shown) through valve body 60. The number of stem spacers 92 may then be removed or added as necessary to provide an accurate drift setting.

Secondary metal-to-metal stem seal 112 provides sealing in the event of fire damage to the other seals and also acts as a stop for upward movement of gate 22. The adjustment of the up-stop drift is made in a manner dependent upon valve manufacture designs but may typically involve threadably engaging the gate with the bonnet stem and rotating until the correct adjustment is reached. Further rotation may be prevented by such means as a pin or other retainer means.

Figure 4:
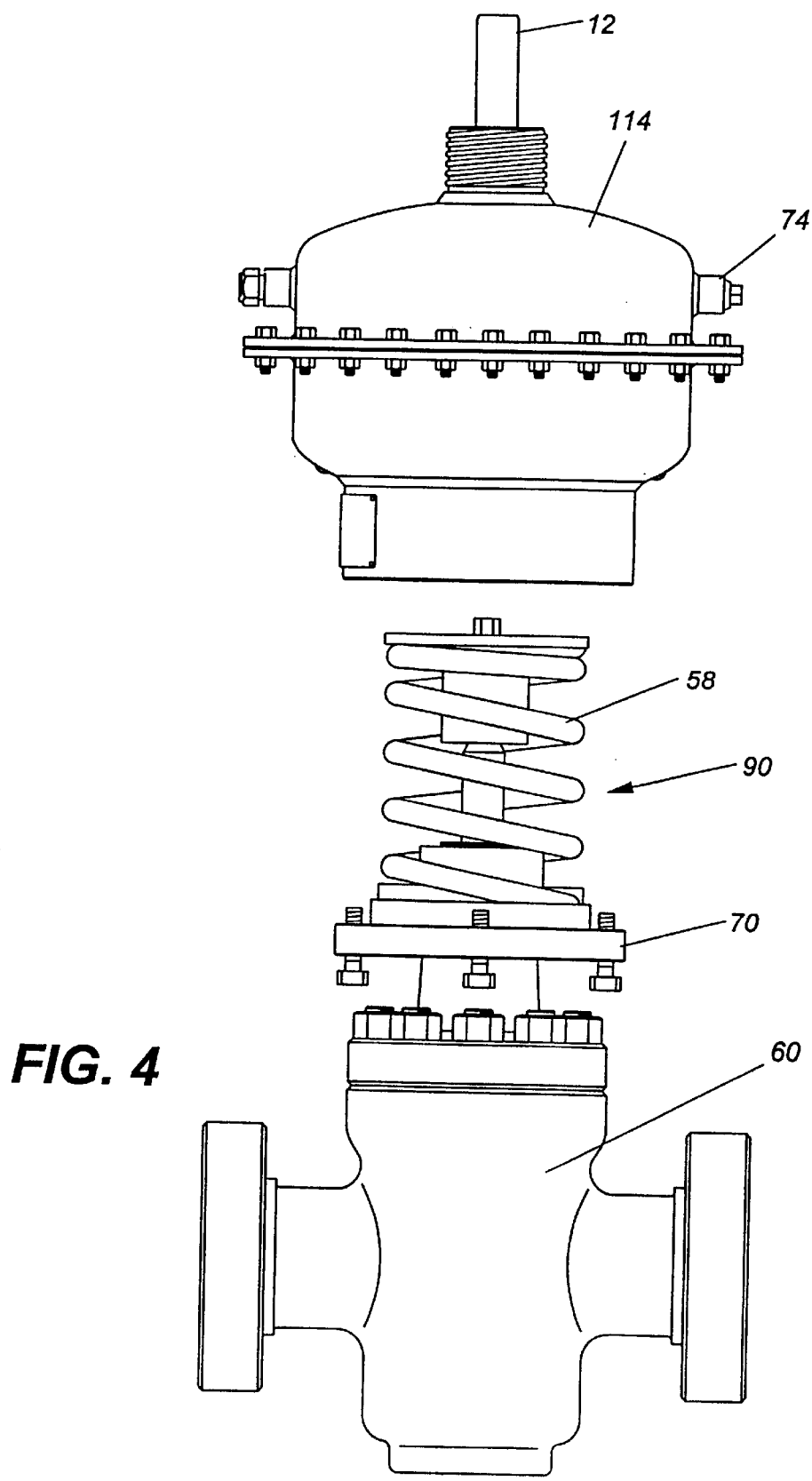
FIG. 4 is an elevational view, of a replaceable operator without readjustment of the down-stop or up-stop drift in a bonnet assembly in accord with the present invention.

FIG. 4 discloses the relative ease with which various operators 114 may be changed out without altering the up-stop and down-stop drift as discussed hereinbefore. Thus the operator may be exchanged with the valve under pressure. No additional drift adjustments are necessary because the alignment is not altered and remains accurate for the particular valve. This feature is especially useful where it may be difficult to make drift realignment. Base plate ring 70 may be rotated without changing the drift to accommodate the piping to inlet 74.

FIG. 5 is a schematic disclosing numerous attachments that can be made to upper plug 50 and inlet valve 74 of actuator 10. Upper plug 50 preferably includes a substantially large diameter threaded outer connection to avoid stresses when using accessories. Clear stem protector 116 protects top shaft 12 from adverse effects of weather, sandblasting, contaminating operating environments, and painting. Heat sensitive lock open device 118 mechanically holds open the actuator and valve when other safety systems are inoperative. This device locks the device in the down position allowing it to rise only in the event of fire. Mechanical override 24 is used to mechanically stroke the valve, and is preferably used on low pressure valves or during installation and testing. Electrical limit switch contact 20 permits remote indication of gate valve position. Various types of fusible plugs 122, quick exhaust valves 124, pneumatic relays 126, and other sensors 128 may be used with inlet 74 and top stem 12.

In the operation of diaphragm-type actuator 10 of the present invention, pressure is applied through fluid port 74 which moves both diaphragm 40 and diaphragm retainer plate 48 axially towards valve body 60. This movement engages downstop 54 to move bonnet stem 22 downward (towards valve body 60) until downstop 54 contacts stem spacers 92, whereupon further downward movement of bonnet stem 22 is prevented. At this point, gate 22 is properly aligned so that the valve is open (assuming a normally configured gate valve). If pressure is lost or purposely evacuated, the valve is closed via pressure from spring 58 acting against downstop 54 to move bonnet stem 22 axially away from valve body 60 until metal-to-metal contact is made at secondary stem seal 112. This action is referred to as fail-closed operation. If required, the valve can be configured with a fail open gate design for vent or blow-down systems.

Figure 6:
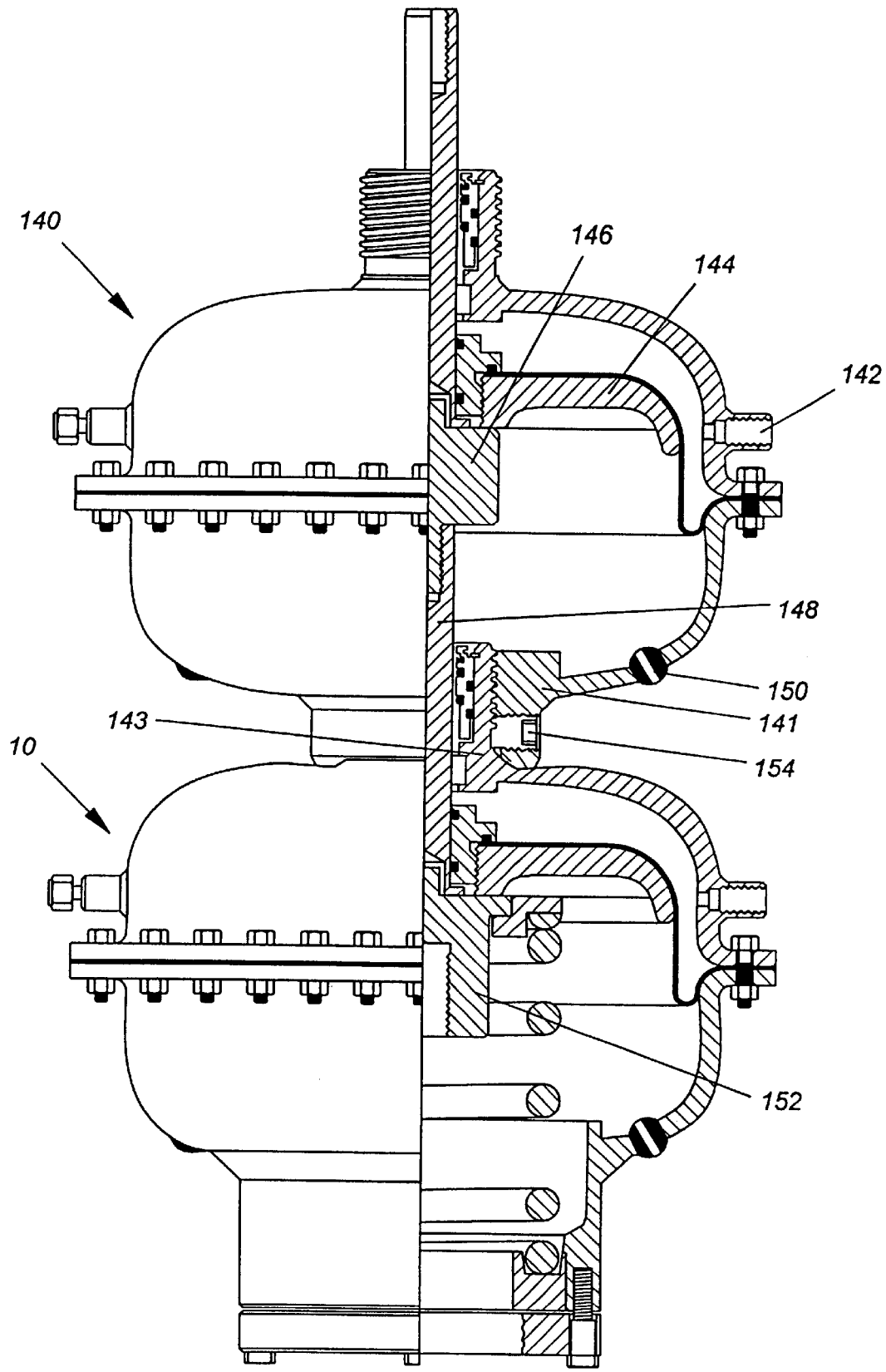
FIG. 6 is an elevational view, partially in section, of a dual actuator assembly in accord with the present invention.

FIG. 6 discloses a dual actuator system which may be used to double the stroke power. Secondary operator 140 preferably threadably attaches to plug 143 via connector 141. Lock down plug 154 prevents rotation of operator 140 with respect to operator 10. Operation of secondary operator 140 is similar to that of single actuator 10. Pressurized fluid enters fluid port 142 causing diaphragm plate 144 to move downwardly, thereby forcing stem adaptor 146 and top shaft 148 downwardly. Air is vented from vent hole 150 during the down stroke. Downstop 152 controls the down stroke drift in the manner discussed hereinbefore.

Figure 7:
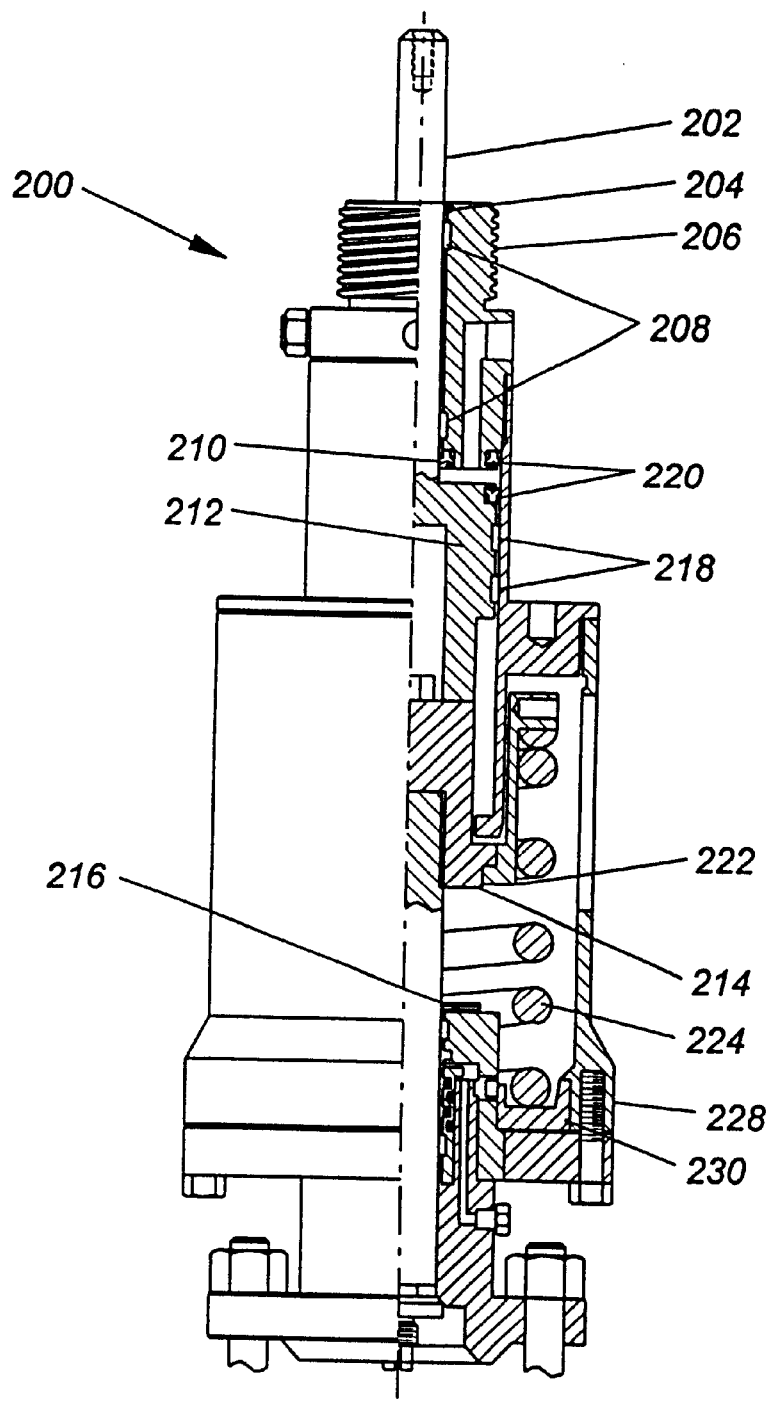
FIG. 7 is an elevational view, partially in section, of a hydraulic valve actuator in accord with the present invention.

FIG. 7 discloses a hydraulic valve actuator 200 embodiment of the present invention. Top shaft 202 is kept clean via rod wiper 204 disposed within removable top plug 206. Dual wear bearings 208, preferably formed of molygard, are used to support top shaft 202. Top plug 206 also includes a Polypak seal 210, preferably formed of Nitroxile. Hydraulic pressure moves piston 212 axially downwardly to move downstop 214 into engagement with stem spacers 216 as described hereinbefore. Piston 212 floats on preferably non-metallic wear bearings 218 and is further sealed with seals 220. Upper spring retainer 222 applies force from coil 224 to move downstop 214 upwardly. Base plate ring 226 is bolted to housing 228 and provides support for lower spring retainer 230 as described with respect to diaphragm-type actuator 10.

The foregoing detailed disclosure and description of the invention is illustrative and explanatory thereof, and it will be appreciated by those skilled in the art, that various changes in the size, shape and materials as well as in the details of the illustrated construction, reliability configurations, or combinations of features of the various valve actuator elements of the present invention may be made without departing from the spirit of the invention.

What is claimed is:

1. A valve actuator for moving a valve gate between open and closed valve positions within a valve body, said valve actuator comprising:

an operator assembly including:
(a) an operator housing defining a pressure chamber therein and having a fluid entry port; and
(b) an operator member with said operator housing movable toward said valve body in response to pressurized fluid introduced into said operator housing pressure chamber through said fluid entry port; and a bonnet assembly including:
(a) a bonnet housing securable to said valve body, said bonnet housing having a bonnet housing bore therethrough;
(b) an elongated bonnet stem having first and second ends, said stem being axially movable in said bonnet housing bore, unconnected at said first end to said operator member and securable at said second end to said valve gate for moving said valve gate to said open and closed valve positions;
(c) a spring for producing a biasing force opposing axial movement of said operator member toward said valve body;
(d) a contact member, separate from said operator member, having an outer flange, and rotatably and axially affixed to said first end of said bonnet stem, and having a surface facing said operator member for drive contact with said operator member;
(e) an upper spring retainer separate from said operator member and said contact member, coaxially surrounding and rotatable with respect to said bonnet stem and said contact member, and having an inner flange for engagement to said bonnet stem and to receive said movement of said operator member toward said valve body;
(f) a lower spring retainer coaxially surrounding said bonnet housing; and
(g) securing means connected to said bonnet housing in surrounding relationship therewith for longitudinally securing said operator housing to said bonnet housing, said securing means permitting removal of said operator assembly from said bonnet assembly leaving the bonnet assembly intact to hold said valve closed when said operator assembly is removed.

2. A valve actuator for moving a valve gate between open and closed valve positions within a valve body, said valve actuator comprising:

an operator assembly including:
(a) an operator housing defining a pressure chamber therein and having a fluid entry port; and
(b) an operator member within said operator housing movable toward said valve body in response to pressurized fluid introduced into said operator housing pressure chamber through said fluid entry port; and a bonnet assembly including:
(a) a bonnet housing securable to said valve body, said bonnet housing having a bonnet housing bore therethrough;
(b) an elongated bonnet stem having first and second ends, said stem being axially movable in said bonnet housing bore, unconnected at said first end to said operator member and securable at said second end to said valve gate for moving said valve gate to said open and closed valve positions, said first end of said bonnet stem being externally threaded;
(c) a spring for producing a biasing force opposing axial movement of said operator member toward said valve body;
(d) a contact member, separate from said operator member, having an outer flange, an internally threaded bore, and a surface facing said operator member for direct contact with said operator member, said threaded end of said bonnet stem being received in said threaded bore of said contact member;
(e) an upper spring retainer separate from said operator member and said contact member, coaxially surrounding and rotatable with respect to said bonnet stem and said contact member, and having an inner flange for engagement of said outer flange of said contact member to transmit said biasing force to said bonnet stem and to receive said movement of said operator member toward said valve body;
(f) a lower spring retainer coaxially surrounding said bonnet housing; and
(g) securing means connected to said bonnet housing in surrounding relationship therewith for longitudinally securing said operator housing to said bonnet housing;

said operator assembly being removable intact from said bonnet assembly leaving the bonnet assembly intact to hold said valve closed when said operator assembly is removed.

3. A valve actuator for moving a valve gate between open and closed valve positions within a valve body, said valve actuator comprising:

an operator assembly including:
(a) an operator housing defining a pressure chamber therein and having a fluid entry port; and
(b) an operator member within said operator housing movable toward said valve body in response to pressurized fluid introduced into said operator housing pressure chamber through said fluid entry port; and a bonnet assembly including:
(a) a bonnet housing securable to said valve body, said bonnet housing having a bonnet housing bore therethrough;
(b) an elongated bonnet stem having first and second ends, said stem being axially movable in said bonnet housing bore, unconnected at said first end to said operator member and securable at said second end to said valve gate for moving said valve gate to said open and closed valve positions;
(c) a spring for producing a biasing force opposing axial movement of said operator member toward said valve body;
(d) a contact member, separate from said operator member, having an outer flange, and rotatably and axially affixed to said first end of said bonnet stem, and having a surface facing said operator member for drive contact with said operator member;
(e) an upper spring retainer separate from said operator member and said contact member, coaxially surrounding and rotatable with respect to said bonnet stem and said contact member, and having an inner flange for engagement of said outer flange of said contact member to transmit said biasing force to said bonnet stem and to receive said movement of said operator member toward said valve body;
(f) a lower spring retainer coaxially surrounding said bonnet housing; and (g) securing means connected to said bonnet housing in surrounding relationship therewith for longitudinally securing said operator housing to said bonnet housing, said securing means including a base ring configured for rotation relative to said bonnet housing without affecting selected bonnet stem drift; said operator assembly being removable intact from said bonnet assembly, leaving the bonnet assembly intact to hold said valve closed when said operator assembly is removed.

* * * * *

(12) INTER PARTES REEXAMINATION CERTIFICATE (0191st)
United States Patent
Young

(10) Number: US 6,250,605 C1
(45) Certificate Issued: *Sep. 21, 2010

(54) VALVE ACTUATOR APPARATUS

(75) Inventor: Terry G. Young, Spring, TX (US)

(73) Assignee: Safoco, Inc., Houston, TX (US)

Reexamination Request:
No. 95/000,017, May 20, 2003

Reexamination Certificate for:
Patent No.: 6,250,605
Issued: Jun. 26, 2001
Appl. No.: 09/538,881
Filed: Mar. 30, 2000

(*) Notice: This patent is subject to a terminal disclaimer.

Related U.S. Application Data

(63) Continuation of application No. 08/968,904, filed on Nov. 6, 1997, now Pat. No. 6,089,531, which is a continuation of application No. 08/206,424, filed on Mar. 4, 1994, now abandoned.

(51) Int. Cl.
*F16K 31/145* (2006.01)
*F16K 31/14* (2006.01)
*F16K 31/126* (2006.01)

(52) U.S. Cl. .................. 251/291; 251/285; 251/61.4
(58) Field of Classification Search ............. 251/61.4, 251/61.2, 284, 285, 291
See application file for complete search history.

(56) References Cited

U.S. PATENT DOCUMENTS

| | | | |
|---|---|---|---|
| 3,608,912 A | 9/1971 | Templin | 277/123 |
| 3,896,835 A | 7/1975 | Wicke | 137/75 |
| RE29,322 E | 7/1977 | Nelson | 251/14 |
| 4,129,283 A | 12/1978 | Taylor | 251/62 |
| 4,135,547 A | 1/1979 | Akkerman et al. | 137/315 |
| 4,157,167 A | 6/1979 | Akkerman | 251/28 |
| 4,271,857 A | 6/1981 | Rowe | 137/73 |
| 4,372,333 A | 2/1983 | Goans | 137/1 |
| 4,568,058 A | 2/1986 | Shelton | 251/62 |
| 4,585,207 A | 4/1986 | Shelton | 251/62 |
| 4,682,757 A | 7/1987 | Shelton | 251/77 |
| 5,067,510 A | 11/1991 | Breaux et al. | 137/77 |
| 6,015,134 A | 1/2000 | Johnson | 251/61.4 |
| 6,089,531 A * | 7/2000 | Young | 251/61.4 |

OTHER PUBLICATIONS

Axelson, "Manumatic" Diaphragm Gate Valve Actuator, (dated 1985 according to opposing counsel in pending litigation).
Gray Tool Company; *Graysafe™ Hydraulic and Pneumatic Acutators:* (4/81) 10m 10/820.
Axelson Incorporated; *Condensed Catalog:* (pp. ICC 0001417;-ICC-0001442); pre 1982.
W-K-M Surface Safety System: Cooper Industries, Flow Control, Catalog S. Issue 5. Copyright 1989, (pp. 1-24).
Cameron: Oil Tool Products 1970-1971, *Automatic Safety Valve.* (pp. 2), (Undated).

(Continued)

*Primary Examiner*—Eric S. Keasel

(57) ABSTRACT

A valve actuator apparatus and method comprises an operator housing secured to a bonnet assembly. The bonnet assembly is secured to the valve body, and includes a bonnet stem movably within a bonnet housing for moving a gate within the valve body to open and close the valve. A downstop member is fixably secured to the bonnet stem and engages removable stem spacers which are added or removed to obtain a selected bonnet stem drift setting. The operator housing connects to a base ring that surrounds the bonnet housing and rotates to allow positioning of a fluid port in the operator housing. The operator housing may removed and replaced without altering the bonnet stem drift adjustment. A top shaft extends from the operator housing and rotates with respect to the bonnet stem to prevent torque transmission from the top shaft to the bonnet stem. A replaceable sealing cartridge sealingly supports the top shaft for axial movement within the operator housing.

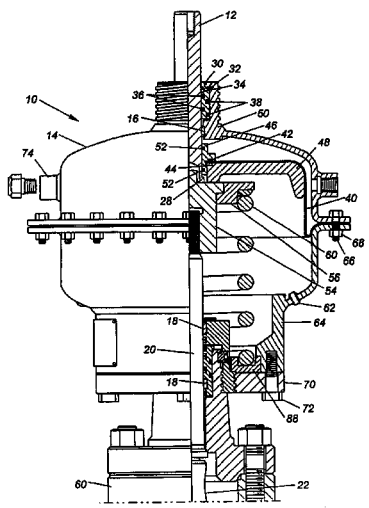

OTHER PUBLICATIONS

LCR Actuator; *Operating Manual for Cameron LC ROCS–1 Actuators Which Meet ANSI/ASME SPPE–1 and API Specification 14D Requirements;* Cameron Iron Works, Inc. SD–1527, Mar. 1981, (pp. 1–21).

*Description of Cameron Type "A" Fail–Safe Valve;* Cooper Iron Works, Inc; Engineering Bulleting No. 170; May 12, 1969. (pp. 1–7).

Baker CAC, Inc.; *Bonnet Assembly*: Unit No. 880–66–7341; Jun. 15, 1999, (pp. 1).

McEvoy–Willis; *Surface Safety Valve (SSV) Hydraulic Actuator,* Catalog No. 103–A; Feb. 1987; (pp. 8).

Cameron Oil Tool Division; *Gate Valves*; Cameron Iron Works, Inc. 1997, (pp. 7).

Cameron Iron Works, Inc., *LCR and HLCR Actuators and Accessories*: 1986–1987 General Catalog, (pp. 2).

Cameron Iron Works, Inc., *Cameron Automatic Safety Valves,* Cameron Oil Products 1972–1973; (pp. 3).

Cameron Iron Works, Inc. *Cameron Gate Valve Products*: (Undated), (pp. 1312–1342).

* cited by examiner

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-3 are confirmed.

* * * * *